United States Patent [19]

Wurl

[11] Patent Number: 4,917,415
[45] Date of Patent: Apr. 17, 1990

[54] LATCHING MECHANISM FOR A TOP OF A VEHICLE, ESPECIALLY PASSENGER MOTOR VEHICLE

[75] Inventor: Willi Wurl, Niefern-Oeschelbronn, Fed. Rep. of Germany

[73] Assignee: Porsche Aktiengesellschaft, Weissach, Fed. Rep. of Germany

[21] Appl. No.: 226,746

[22] Filed: Aug. 1, 1988

[30] Foreign Application Priority Data

Jul. 31, 1987 [DE] Fed. Rep. of Germany ....... 3725431

[51] Int. Cl.⁴ .............................. B60J 7/12; F05C 5/00
[52] U.S. Cl. ..................................... 292/113; 296/224;
292/DIG. 5; 292/118
[58] Field of Search ................ 296/224, 218; 292/113,
292/DIG. 5, 247, 224, 100, 66, 118, 126, 134,
107, DIG. 41

[56] References Cited

U.S. PATENT DOCUMENTS

| | | | |
|---|---|---|---|
| 3,129,025 | 4/1964 | Krueger | 292/196 |
| 3,584,912 | 6/1971 | Leger | 296/117 |
| 3,610,681 | 10/1971 | Trenkler | 292/256.75 |
| 3,712,665 | 1/1973 | Klein | 292/DIG. 5 |
| 4,220,368 | 9/1980 | Ferrigan | 296/224 |
| 4,307,906 | 12/1981 | Schenk | 292/247 |
| 4,415,189 | 11/1983 | Kastelic, Jr. | 292/196 |
| 4,801,173 | 1/1989 | Trenkler | 292/302 |
| 4,817,999 | 4/1989 | Drew | 292/DIG. 5 |

FOREIGN PATENT DOCUMENTS

| | | | |
|---|---|---|---|
| 1925227 | 10/1973 | Fed. Rep. of Germany . | |
| 1113961 | 4/1956 | France | 292/DIG. 5 |
| 1209555 | 3/1960 | France | 296/224 |

*Primary Examiner*—Gary L. Smith
*Assistant Examiner*—Eric K. Nicholson
*Attorney, Agent, or Firm*—Barnes & Thornburg

[57] ABSTRACT

A latching mechanism for a top of a motor vehicle which is tightened against a fixed body, includes a support bracket arranged on the side of the top having an operating lever supported about a first transverse axis as well as a pivotal latching member which cooperates with a receiving device on the side of the body. For improving the operating comfort of the latching mechanism, the operating lever is connected with the latching member by way of a guide lever. Furthermore, the latching member cooperates with the support bracket and the receiving means by way of a positive control in such a manner that during the pivoting of the operating lever into its raised locking position, a defined upward movement of the latching member in the direction toward the receiving means and a following tightening movement inside of the receiving means take place.

22 Claims, 5 Drawing Sheets

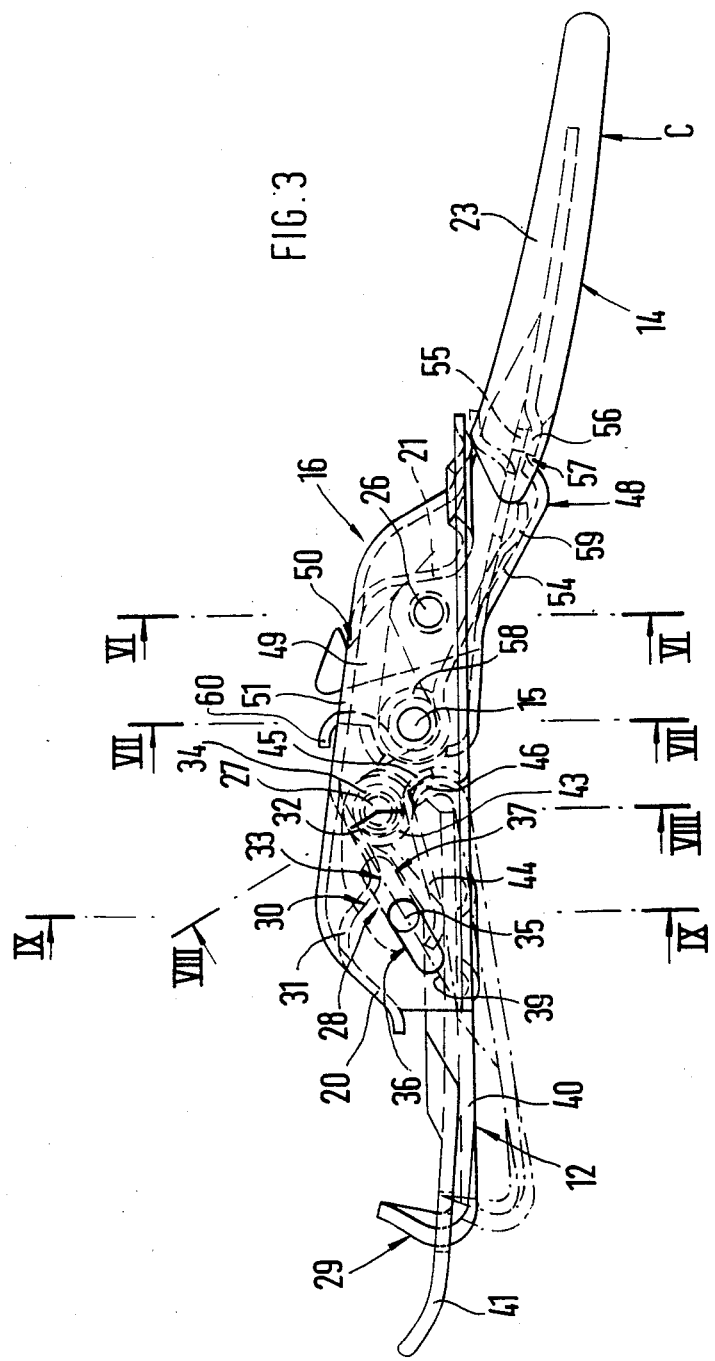

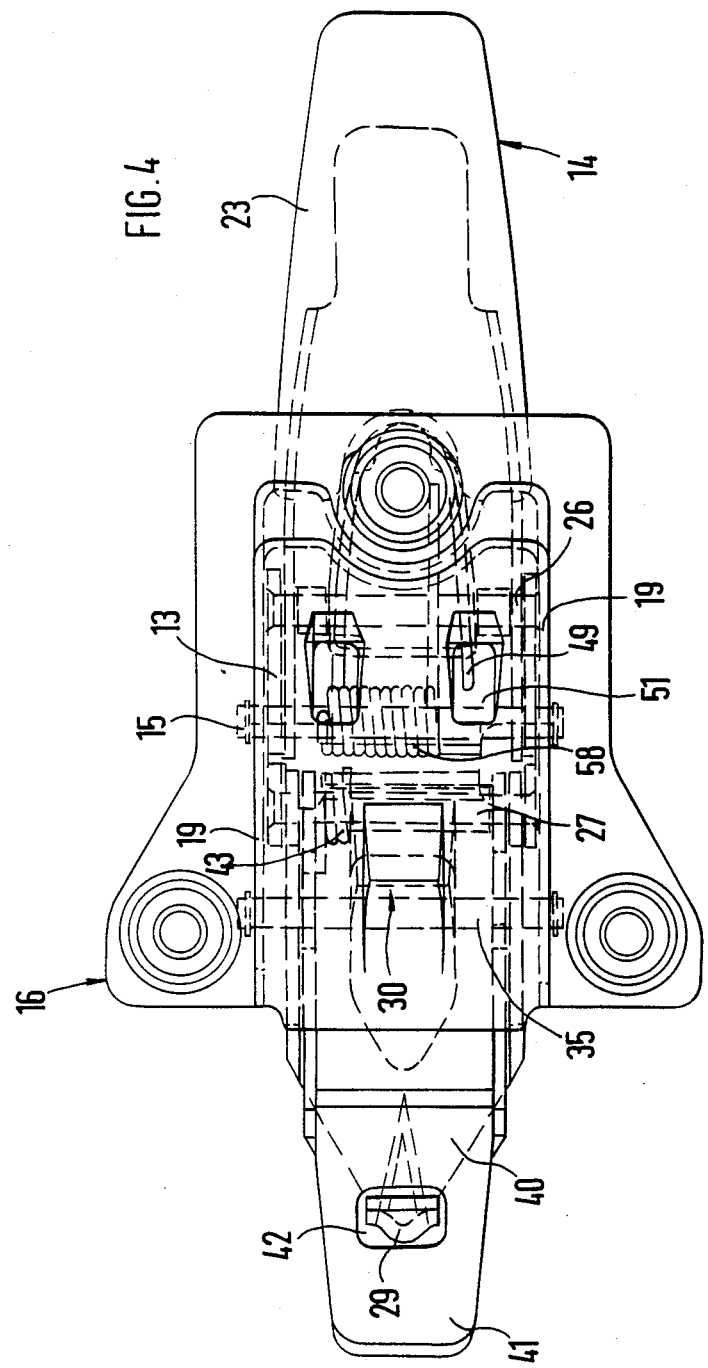

LATCHING MECHANISM FOR A TOP OF A VEHICLE, ESPECIALLY PASSENGER MOTOR VEHICLE

BACKGROUND AND SUMMARY OF THE INVENTION

The present invention relates to a latching mechanism for a top of a vehicle, especially of a passenger motor vehicle, which is tightened against a fixed body, whereby the latching mechanism includes a support bracket arranged on the side of the top and having an operating lever supported about a first transverse shaft as well as a pivotal latching member that cooperates with a receiving means on the body side.

In a known latching mechanism of the aforementioned type operating according to the knee-lever principle (DE-PS 19 25 227), a hook-shaped receiving means is provided at the bottom side of the windshield frame, in which is suspended a bow-shaped latching member, whereby by pivoting the operating lever, the top is tightened against the windshield frame. This arrangement entails the disadvantage that the closing, respectively, disengaging of the latching mechanism is complicated and requires several manipulations because prior to the actuation of the operating lever, the latching member has to be connected by hand with the receiving means, respectively, again has to be separated therefrom by hand.

It is the object of the present invention to provide in a latching mechanism for a top such measures that with good functioning the operation of the latching mechanism is simplified.

The underlying problems are solved according to the present invention in that the operating lever is connected with the latching member by way of at least one guide lever and the latching member cooperates by way of a positive control with the support bracket, respectively, the receiving means in such a manner that during the pivoting of the operating lever into its raised closing position, a defined upward movement of the latching member toward the receiving means takes place and a subsequent tightening movement of the latching member inside of the receiving means follows.

The principal advantages achieved with the present invention reside in that the operating comfort of the latching mechanism is considerably improved by the guide lever and the positive control of the latching member because only the operating lever has to be pivoted so that a one-handed operation of the latching mechanism becomes possible. The latching member carries out a defined forced movement during the pivoting of the operating lever in such a manner that the latching member in a first phase is moved up automatically toward the receiving means and engages into the same before, in a second step, a tightening of the latching member takes place in the longitudinal direction. During the further pivoting of the operating lever, the top is automatically pulled down into its closing position by the latching lug which beginning with a predetermined pivot angle of the operating lever comes into abutment at the bottom side of the windshield frame. The defined movement of the latching member is assured by the shape of the guide track on the side of the support bracket and the longitudinally displaceable bearing support of the latching member at the support bracket. The spring-loaded detent pawl supported at the operating lever assures for an additional stopping of the operating lever in its closed position which contributes to an increase of the anti-theft safety. The latching mechanism in accordance with the present invention consists of components that can be manufactured in a simple manner and has only a slight structural height.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 3 is a partial side elevational view of FIG. 2;

FIG. 4 is a plan view on the closed position of the latching mechanism in accordance with the present invention;

DETAILED DESCRIPTION OF THE DRAWINGS

Figure 1:
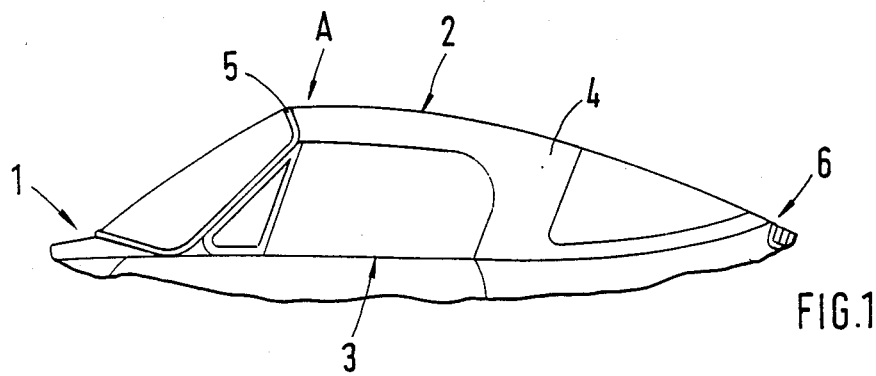
FIG. 1 is a partial side elevational view of a passenger motor vehicle with a top.

Referring now to the drawing wherein like reference numerals are used throughout the various views to designate like parts, the passenger motor vehicle 1 illustrated in FIG. 1 includes a body which is formed above a belt line 3 by a top 4 which extends between a windshield frame 5 and a rear section 6 and is detachably retained in position at the windshield frame 5.

The windshield frame 5 is formed by a hollow body-like extrusion profile 7 (FIG. 2) which is arranged at the inside of a windshield 8 and is connected with the windshield 8 by way of a circumferential adhesive element 9.

For the detachable fastening of the top 4 at the windshield frame 5, one latching mechanism 10 is provided on each of the two sides of a center longitudinal plane of the passenger motor vehicle 1. The latching mechanism 10 operating according to the knee-lever principle includes a receiving portion 11 of the extrusion profile II arranged on the body side, into which a latching member 12 supported on the side of the top engages in the closed position A of the top 4 and tightens the top 4 against an upper portion of the windshield 8. The latching member 12 is connected by way of at least one guide lever 13 with an operating lever 14 which is pivotally connected by way of a first transverse shaft 15 at a fixed support bracket 16.

The support bracket 16 is profiled approximately U-shaped—viewed in cross section—whereby its open side faces a vehicle passenger space 17. Corresponding to FIG. 2, the support bracket 16 is inserted into a niche-shaped recess of a forward transversely extending frame 18 of the top 4 and is fixed at the frame 18 by means of fastening bolts (not shown).

The two side walls 19 of the support bracket 16 (FIGS. 6–9) are connected with each other forwardly by a transverse wall 20 (FIG. 2) and toward the rear by an inclined wall section 21. Furthermore, the support bracket 16 includes an upper boundary wall 22 (FIGS. 2 and 6–9).

The operating lever 14 extends sectionwise inside of the side walls 19 of the support bracket 16 and is profiled approximately U-shaped (FIG. 7) whereby the open side is directed upwardly toward the top 4. Outside of the support bracket 16, and more particularly within the gripping area, the operating lever 14 is incased with a covering 23 of elastic material such as rubber, plastic material, or the like (FIG. 3). Within the area of its pivotal connection at the support bracket 16, the operating lever 14 includes at the free ends of its two outwardly disposed legs 24 an outwardly directed bent-off portion 25 each (FIGS. 2 and 7) which are extended toward the adjacent side wall 19 of the support bracket 16. The operating lever 14 is fixed in the transverse direction by the two bent-off portions 25 (FIG. 7).

Figure 6:
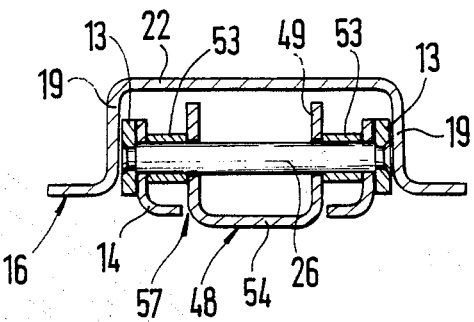
FIG. 6 is a cross-sectional view taken along line VI—VI of FIG. 3.
Figure 7:
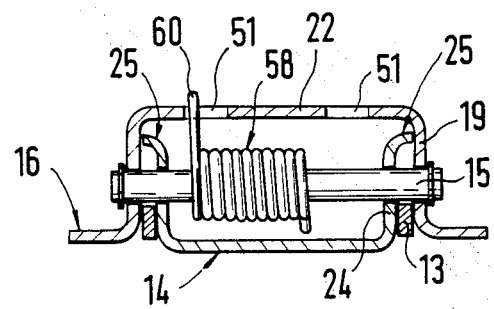
FIG. 7 is a cross-sectional view taken along line VII—VII of FIG. 3.

The first fixed transverse shaft 15 connects the two side walls 19 of the support bracket 16 (FIG. 7). One guide lever 13 each is provided at the two longitudinal sides of the operating lever 14 (FIGS. 2, 6–9) which is connected by way of a second transverse shaft 26 (FIGS. 2, 3 and 6) with the operating lever 14 and by way of a third transverse shaft 27 (FIGS. 2, 3 and 8) with the latching member 12. The second transverse shaft 26 and the third transverse shaft 27 change their position during the pivoting of the operating lever 14.

In the raised closed position C of the operating lever 14 (FIG. 3) the first transverse shaft 15 is arranged approximately in the center between the second transverse shaft 26 and the third transverse shaft 27—as viewed in the longitudinal direction—, whereby the second transverse shaft 26 extends adjacent the wall section 21 of the support bracket 16 (FIG. 3).

The two guide levers 13 extend outside of the operating lever 14, respectively, latching member 12 and inside of the support bracket 16.

The latching member 12 cooperates by way of a positive control 28 (FIGS. 2 and 3) with the support bracket 16, respectively, the operating lever 14 in such a manner that during the pivoting of the operating lever 14 in the upward direction a defined upward movement of the latching member 12 toward the receiving portion 11 of the extrusion profile 7 as well as a subsequent tightening movement of the latching member 12 in the longitudinal direction—and more particularly opposite the driving direction—take place. The upwardly bent hook-shaped end area 29 of the latching member 12 moves during the pivoting of the operating lever 14 parallel to a track D (FIG. 2) whereby the track D indicates the movement of the free end of the latching member 12 and is shown in dash and dot lines in FIG. 2. The track 12 is composed of a first radius-shaped section D1, of a subsequent curve-shaped section D2, and of a rectilinear, obliquely extending end area D3, whereby the end area D3 extends approximately parallel to a center axis 39 of a guide track 36 (FIGS. 3 and 5) on the side of the support bracket.

The positive control 28 for the latching member 12 includes a guide track 30 arranged on the side of the support bracket (FIGS. 2–5, 8 and 9) which extends in a center forwardly disposed area of the upper boundary wall 22 of the support bracket 16. The guide track 30 is made in one piece with the support bracket 16 and is composed of two sections 31 and 32 which are connected with each other by way of a cam 33 (FIG. 3).

Figure 8:
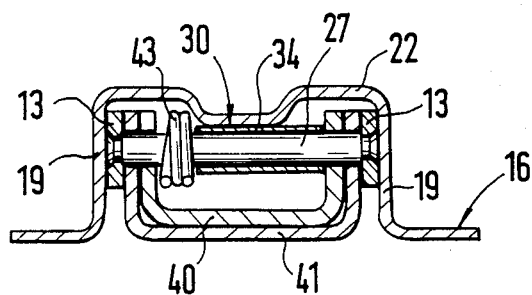
FIG. 8 is a cross-sectional view taken along line VIII—VIII of FIG. 3.

The first section 31 which is connected to the transverse wall 20 by way of a rounded-off portion, extends radius-shaped to the lower cam 33 whereas the second section 32 leads obliquely upwardly rectilinearly away from the cam 33 toward the boundary wall 22. A roller 34 made of steel or plastic material cooperates with the guide track 30. The roller 34 is arranged underneath the guide track 30 on the transverse shaft 27 and is fixed in the transverse direction (FIG. 8).

Figure 5:
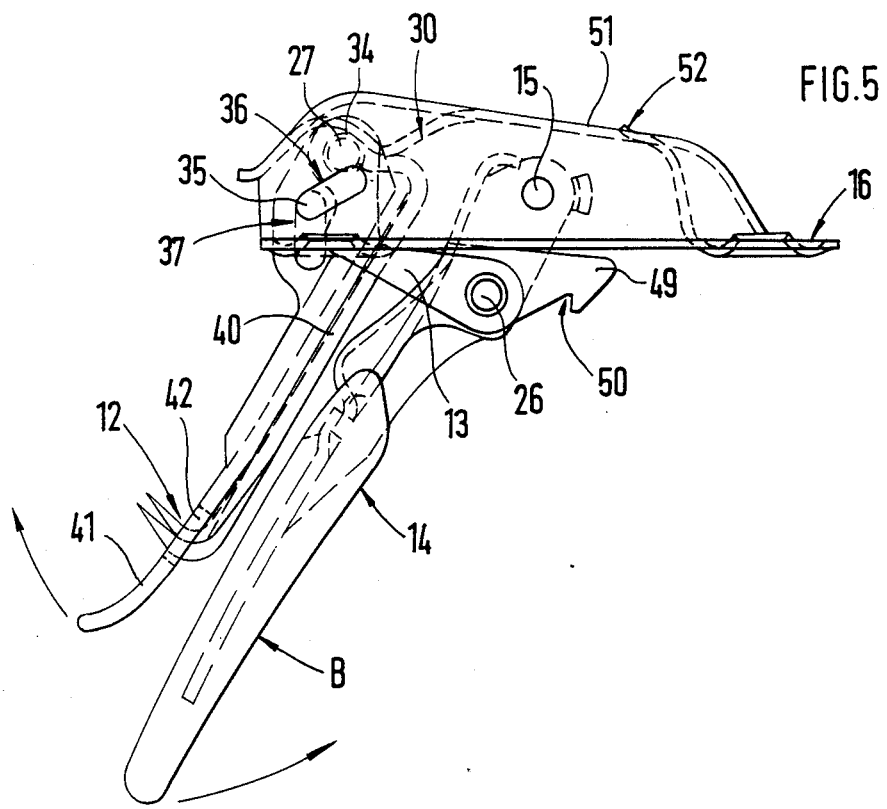
FIG. 5 is a side elevational view on the open position of the latching mechanism in accordance with the present invention.

In the closing position C of the operating lever 14, the roller 34 is in a center area of the longitudinal extent of the second section 32 of the guide track 30 (FIG. 3). During the pivoting of the operating lever 14 downwardly into its open position B, the roller 34 travels along the second section 32 downwardly toward the cam 33, passes the same and then moves along the first section 31 upwardly into its forward end position (FIG. 5). The second section 32 (FIG. 2) extends parallel to the center axis 39 and is connected in the upper area with the boundary wall 22 by way of a rounded-off transition area.

Furthermore, the positive control 28 includes a bolt 35 extending in the transverse direction (FIGS. 3, 5 and 9) which connects the latching member 12 with the side walls 19 of the support bracket 16, whereby the bolt 35 extends through obliquely extending longitudinal slots 36 and 37 of the support bracket 16 and of the latching member 12 and is displaced inside of the longitudinal slots 36 and 37 during the actuation of the operating lever 14.

Figure 9:
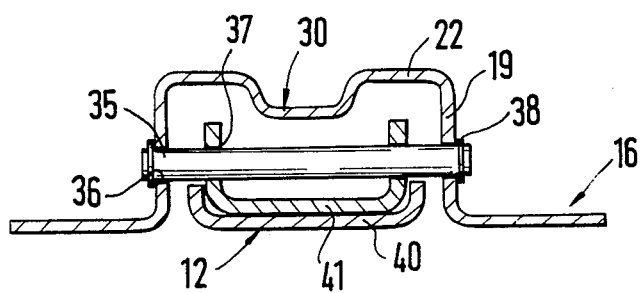
FIG. 9 is a cross-sectional view taken along line IX—IX of FIG. 3.

The bolt 35 is secured outside of the support bracket 16 against axial displacement by disks 38 (FIG. 9). The longitudinal slots 36 and 37 in the support bracket 16 and in the latching member 12 are aligned in the closing position C of the operating lever 14 with respect to a common center axis 39, however, they are arranged offset to one another, as viewed in the longitudinal direction, whereby the longitudinal slots 36 and 37 overlap sectionwise.

In the lowered open position B of the operating lever 14, the bolt 35 extends at the forwardly disposed end of the longitudinal slot 36 on the side of the support bracket—as viewed in the driving direction—and at the upper end of the longitudinal slot 37 on the side of the latching member (FIG. 5), whereas in the raised closed position C of the operating lever 14, the bolt 35 extends at the rear end of the longitudinal slot 36 on the side of the support bracket and at the downwardly disposed end of the longitudinal slot 37 on the side of the latching member.

The latching member 12 is composed of a spring-loaded latching hook 40 and of a latching lug 41 (FIGS. 5 and 9) whereby the latching hook 40 and the latching lug 41 are pivotally supported in common on the third transverse shaft 27. The latching hook 40 abutting at the bottom side of the latching lug 41 engages around the latching lug 41 within the area of the common pivotal connection in the transverse direction (FIG. 9).

The upwardly bent hook-shaped end area 29 of the latching hook 40 which cooperates form-lockingly with the receiving portion 11 of the extrusion profile 7, when the top 4 is latched, is extended through a rectangular opening 42 of the latching lug 41 and projects beyond the same in the upward direction.

The spring element for the latching hook 40 is formed by a leg spring 43 (FIGS. 3 and 8) whose cylindrical section is disposed on the third transverse shaft 27 adjacent the roller 34 whereas the two angularly bent-off ends 44 and 45 cooperate, on the one hand, with the inner side of the latching lug 41 and, on the other, with an end-face upwardly directed support 46 of the latching hook 40 (FIG. 3). The latching hook 40 is always displaced upwardly toward the latching lug 41 by the spring element 43.

The latching lug 41 extends forwardly beyond the latching hook 40 and is matched within this area to the outer shape of a collar 47 (FIG. 2) inserted into the receiving portion 11 of the extrusion profile 7. The collar 47 precludes a scratching of the windshield frame 5 by the latching member 12.

The top 4 is always pulled automatically downwardly into its closing position A by the latching lug 41 during the actuation of the operating lever 14. A disengageable detent pawl 48 (FIGS. 3 and 6) which is provided for the additional arresting of the operating lever 14 in the closing position of the latching mechanism 10, is rotatably supported about the second transverse shaft 26 and cooperates latchingly with the support bracket 16. The U-shaped profiled detent pawl 48 includes two lateral, upwardly extending arms 49 which are provided with detent noses 50 at the upper end (FIGS. 3 and 5). The two arms 49 protrude through corresponding openings 51 of the upper boundary wall 22 of the support bracket 16, whereby the detent noses 50 engage from behind upwardly bent tongue-shaped wall sections 52 of the upper boundary wall 22. The detent pawl 48 is fixed in the transverse direction by two sleeves 53 (FIG. 6) seated on the transverse shaft 26 whereby each sleeve 53 extends between the outside of the detent pawl 48 and the inside of the operating lever 14.

The arms 49 of the detent pawl 48 which are approximately angularly shaped, as viewed in side view, are connected with each other in the lower area by a transversely extending wall section 54 (FIGS. 3 and 6), whereby a rearwardly disposed, upwardly bent flange 55 of the wall section 54 is supported at the inside 56 of the operating lever 14. An aperture 57 is provided in the operating lever 14 for receiving the detent pawl 48 (FIG. 6). The detent pawl 48 cooperates with a leg spring 58 (FIGS. 3 and 7) which is seated on the first transverse shaft 15. A bent-off end 59 of the leg spring 58 abuts at the inside of the wall section 54 of the detent pawl 48 whereas the other end 60 is supported at the edge of the opening 51 of the upper boundary wall 22. The leg spring 58 effects, on the one hand, an elastic bearing support of the detent pawl 48; on the other the latching mechanism is retained in its open position B.

Figure 2:
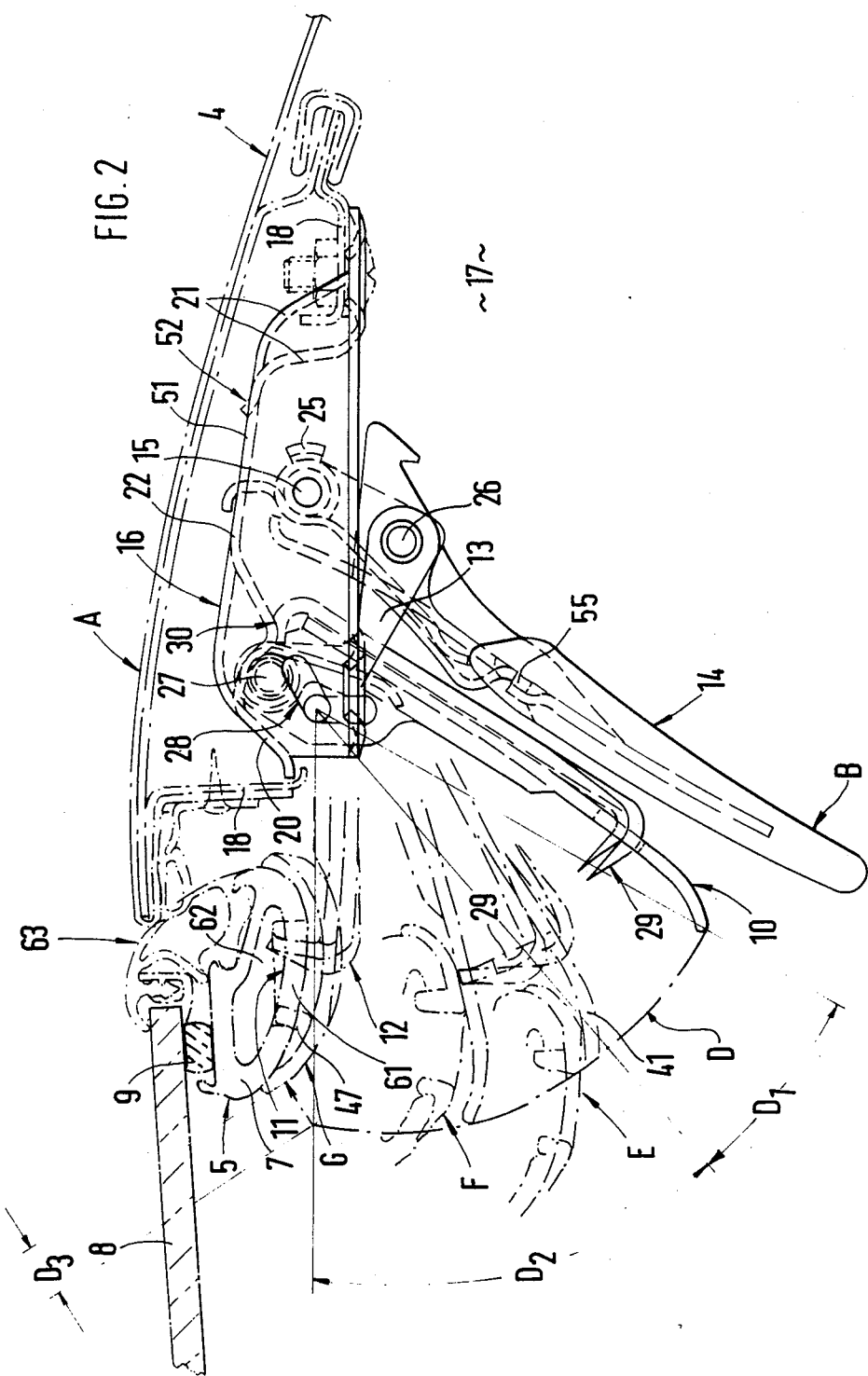
FIG. 2 is a cross-sectional view through a windshield frame and a forward edge area of the top with a latching mechanism in accordance with the present invention, partially in cross section and on an enlarged scale, whereby the windshield frame is rotated approximately into a horizontal position.

The receiving portion 11 of the extrusion profile 7 is constructed in one piece with the windshield frame 5 and is formed by a slot-shaped opening 61, respectively, a hollow space 62 of the windshield frame 5 (FIG. 2). The collar 47 is clipped into the opening 61 provided at the bottom side of the windshield frame 5.

The opening and the closing of the top 4 takes place as follows:

During the closing of the top 4, the latter is pivoted from its folded-back rest position so far forwardly until the forward frame 18 is about 20 mm. above the windshield frame 5. The latching mechanism 10 of the top 4 thereby assumes a lowered open position B in which the latching member 12 and the operating lever 14 extend approximately parallel to one another and are inclined obliquely forwardly (FIG. 5). The latching member 12 carries out an upward movement along the guide track D as a result of the subsequent pivoting-up of the operating lever 14 so that the latching lug 41 comes into abutment with the windshield frame 5 (see intermediate position E). This takes place approximately after half the pivot movement of the operating lever 14. The top 4 is automatically pulled down by a further pivot movement of the operating lever 14 in the upward direction until it abuts under prestress on a sealing member 63 on the side of the body. The latching hook 40 moves during the actuation of the operating lever 14 parallel to the curved track D so that the latching hook 40 initially is moved up toward the receiving portion 11 of the extrusion profile 7 and then carries out a tightening movement opposite the driving direction inside of the receiving means 11.

In the intermediate position E, the latching lug 41 abuts at the bottom side of the windshield frame 5 and the hook-shaped end area 29 of the latching hook 40 is located to the rear of the windshield frame 5, as viewed in the driving direction.

In the intermediate position F, the latching lug 41 has already travelled further forwardly and the hook-shaped end area 29 of the spring-loaded latching hook 40 is pivoted downwardly a slight amount by the windshield frame 5 and more particularly for such length of time until the end area 29 engages in the opening 61 of the windshield frame 5. The latching hook 40 is then pivoted upwardly by the spring leg 43 until it abuts at the bottom side of the latching lug 41. When the operating lever 14 assumes its upwardly disposed locking position C, an automatic latching takes place at the same time between the detent pawl 48 and the support bracket 16.

During the opening of the latching mechanism 10, at first the detent pawl 48 is manually unlatched and thereafter the operating lever 14 can be pivoted downwardly, as a result of which the latching member 12 is moved out of the receiving portion 11 of the extrusion profile 7 and the top 4 can be tilted or folded rearwardly.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A latching mechanism for a top of a vehicle, which is tightened against a fixed body, comprising;
   support bracket means arranged on a side of the top;
   operating lever means supported about a first transverse shaft;
   a pivotal latching member cooperating with a receiving means on a side of the body;
   the operating lever means being operatively connected with the latching member by at least one guide lever means, which guide lever means is rotatably connected with the operating lever means by way of a second transverse shaft and with the latching member by way of a third transverse shaft;

guide track means provided at the support bracket means which cooperates with a roller means seated on the third transverse shaft;

a bolt extending in the transverse direction to connect the latching member and the support bracket means to each other;

the bolt extending through longitudinal slots of the support bracket means and of the latching member and being displaced within the longitudinal slots by actuation of the operating lever means; and the latching member, during the pivoting of the operating lever means into a raised closing position, follows a defined upward movement into the receiving means and a subsequent rearward longitudinal tightening movement inside of the receiving means.

2. A latching mechanism according to claim 1, wherein there are two guide lever means, located respectively on opposite sides of the operating lever means.

3. A latching mechanism according to claim 1, wherein the longitudinal slots in the support bracket means and the latching member have end portions aligned in the closed position of the latching mechanism with respect to a common center axis and extend in opposite directions with respect to one another in the longitudinal direction.

4. A latching mechanism according to claim 2, wherein the latching member includes a spring-loaded latching hook and a latching lug, whereby the latching hook and the latching lug are rotatably arranged on the third transverse shaft.

5. A latching mechanism according to claim 4, wherein the latching hook abuts at a bottom side of the latching lug, whereby an upwardly bent-off end area of the latching hook extends through an opening of the latching lug.

6. A latching mechanism according to claim 4, wherein the latching lug protrudes forwardly beyond the latching hook.

7. A latching mechanism according to claim 1, wherein the operating lever means in its raised closed position is latchingly connected with the support bracket means by way of a disengageable detent pawl.

8. A latching mechanism according to claim 7, wherein a spring-loaded detent pawl is rotatably supported on the second transverse shaft, a nose portion of the detent pawl engaging from behind a wall section of an upper boundary wall of the support bracket means.

9. A latching mechanism according to claim 7, wherein in the closing position of the latching mechanism the detent pawl is supported in a downwardly located area with an end-face flange at the inside of the operating lever means.

10. A latching mechanism according to claim 4, wherein the latching lug during the pivoting of the operating lever means cooperates with a lower side of the windshield frame.

11. A latching mechanism according to claim 1, wherein the receiving means is a unitary portion of a windshield frame and is represented by a slot-shaped opening, respectively, an inwardly disposed hollow space of the windshield frame, and wherein a collar is inserted into said opening.

12. A latching mechanism according to claim 4, wherein the longitudinal slots in the support bracket means and the latching member have end portions aligned in the closed position of the latching mechanism with respect to a common center axis and extend in opposite directions with respect to one another in the longitudinal direction.

13. A latching mechanism according to claim 12, wherein an end area of the latching hook is displaced parallel to a track of the latching member, whereby the track is composed of a first radius-shaped section, of a curve-shaped section adjoining the same and of an end area, and wherein the end area extends parallel to the center axis.

14. A latching mechanism according to claim 3, wherein the latching member includes a spring-loaded latching hook and a latching lug, whereby the latching hook and the latching lug are rotatably arranged on the third transverse shaft.

15. A latching mechanism according to claim 14, wherein a latching hook abuts at the bottom side of the latching lug, whereby an upwardly bent-off end area of the latching hook extends through an opening of the latching lug.

16. A latching mechanism according to claim 15, wherein the latching lug protrudes forwardly beyond the latching hook.

17. A latching mechanism according to claim 2, wherein the operating lever means in its raised closed position is latchingly connected with the support bracket means by way of a disengageable detent pawl.

18. A latching mechanism according to claim 17, wherein a spring-loaded detent pawl is rotatably supported on the second transverse shaft, a nose portion of the detent pawl engaging from behind a wall section of an upper boundary wall of the support bracket means.

19. A latching mechanism according to claim 18, wherein in the closing position of the latching mechanism the detent pawl is supported in a downwardly located area with an end-face flange at the inside of the operating lever means.

20. A latching mechanism according to claim 14, wherein the latching lug during the pivoting of the operating lever means cooperates with a lower side of the windshield frame.

21. A latching mechanism according to claim 14, wherein the receiving means is a unitary portion of a windshield frame and is represented by a slot-shaped opening, respectively, an inwardly disposed hollow space of the windshield frame, and wherein a collar is inserted into said opening.

22. A latching mechanism according to claim 21, wherein an end area of the latching hook is displaced parallel to a track of the latching member, whereby the track is composed of a first radius-shaped section, of a curve-shaped section adjoining the same and of an end area, and wherein the end area extends parallel to the center axis.

* * * * *